(12) United States Patent
Héroux (10) Patent No.: US 10,739,518 B2
(45) Date of Patent: Aug. 11, 2020

(54) OPTICAL COMPONENTS FOR WAVELENGTH DIVISION MULTIPLEXING WITH HIGH-DENSITY OPTICAL INTERCONNECT MODULES

(71) Applicant: INTERNATIONAL BUSINESS MACHINES CORPORATION, Armonk, NY (US)

(72) Inventor: Jean Benoit Héroux, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 152 days.

(21) Appl. No.: 14/976,463

(22) Filed: Dec. 21, 2015

(65) Prior Publication Data

US 2017/0176683 A1 Jun. 22, 2017

(51) Int. Cl.
*G02B 6/42* (2006.01)
*G02B 6/293* (2006.01)
(Continued)

(52) U.S. Cl.
CPC ....... *G02B 6/2938* (2013.01); *G02B 6/12004* (2013.01); *G02B 6/29329* (2013.01); *G02B 6/32* (2013.01); *G02B 6/34* (2013.01); *G02B 6/425* (2013.01); *G02B 6/429* (2013.01); *G02B 6/4214* (2013.01); *G02B 6/4215* (2013.01);
(Continued)

(58) Field of Classification Search
CPC ...... G02B 6/12; G02B 6/2938; G02B 6/4214; G02B 6/4215; G02B 6/4204; G02B 6/43
See application file for complete search history.

(56) References Cited

U.S. PATENT DOCUMENTS

| 5,627,923 A | 5/1997 | Kakizaki |
| 6,611,544 B1 * | 8/2003 | Jiang .................. H01S 5/18 372/50.1 |

(Continued)

FOREIGN PATENT DOCUMENTS

| CN | 204405900 | 6/2015 |
| EP | 1341019 | 9/2003 |

(Continued)

OTHER PUBLICATIONS

Masao Tokunari et al., High-Bandwidth Density Optical I/O for High-Speed Logic Chip on Waveguide-Integrated Organic Carrier, 2011 IEEE 61st Electronic Components and Technology Conference (ECTC), Lake Buena Vista, FL, May 2011, pp. 819-822.

(Continued)

*Primary Examiner* — Sung H Park
*Assistant Examiner* — Hoang Q Tran
(74) *Attorney, Agent, or Firm* — Tutunjian & Bitetto, P.C.; Vazken Alexanian (57) ABSTRACT

Wavelength division multiplexing devices, and methods of forming the same, include a coupling lens and a waveguide, the lens being positioned over a mirror formed in a transmission path of the waveguide. The mirror reflects incoming light signals out of the transmission path through the lens and further reflects light signals coming from the lens and into the transmission path. An optical chip is positioned near a focal length of the lens. The optical chip has an optical filter configured to transmit a light signal at a first wavelength and to reflect received light signals at wavelengths other than the first wavelength.

21 Claims, 6 Drawing Sheets

(51) Int. Cl.
  *G02B 6/12* (2006.01)
  *G02B 6/32* (2006.01)
  *G02B 6/34* (2006.01)
(52) U.S. Cl.
  CPC .......... *G02B 6/4246* (2013.01); *G02B 6/2931* (2013.01); *G02B 6/29311* (2013.01); *G02B 6/29362* (2013.01)

(56) References Cited

U.S. PATENT DOCUMENTS

| | | | | |
|---|---|---|---|---|
| 7,869,671 | B2* | 1/2011 | Ishida | G02B 6/43 385/14 |
| 2001/0046247 | A1* | 11/2001 | Hartman | A61B 18/20 372/57 |
| 2002/0031155 | A1* | 3/2002 | Tayebati | G01J 3/26 372/50.1 |
| 2004/0105161 | A1 | 6/2004 | Tatum et al. | |
| 2006/0239605 | A1* | 10/2006 | Palen | G02B 6/4206 385/14 |
| 2007/0147842 | A1* | 6/2007 | Haney | G02B 6/43 398/118 |
| 2008/0205899 | A1* | 8/2008 | Kopp | G02B 6/4232 398/139 |
| 2008/0310844 | A1 | 12/2008 | Zhou et al. | |
| 2009/0277228 | A1* | 11/2009 | Ishida | G02B 6/12002 65/387 |
| 2011/0080657 | A1* | 4/2011 | Takai | G02B 6/4206 359/742 |
| 2012/0050735 | A1* | 3/2012 | Higgins | G01L 1/24 356/326 |
| 2013/0230280 | A1* | 9/2013 | Kadar-Kallen | G02B 6/4204 385/33 |
| 2015/0117811 | A1 | 4/2015 | Héroux et al. | |

FOREIGN PATENT DOCUMENTS

| | | |
|---|---|---|
| JP | S63205612 A | 8/1988 |
| JP | H10293219 A | 11/1998 |
| JP | 2003255166 A | 9/2003 |
| JP | 2004070311 A | 3/2004 |
| JP | 2012068539 A | 4/2012 |
| JP | 2015087756 A | 5/2015 |
| WO | 2009098834 A1 | 8/2009 |

OTHER PUBLICATIONS

Brian E. Lemoff et al., MAUI: Enabling Fiber-to-the-Processor With Parallel Multiwavelength Optical Interconnects, Journal of Lightwave Technology, vol. 22, No. 9, Sep. 2004.
Office Action for Application No. DE102016221806.9 dated Jun. 26, 2018.
Examination Report for Application No. GB1613315.9 dated Nov. 16, 2018.
Japanese Office Action of related case No. 2016-244439, dated Mar. 17, 2020, 8 pages.

\* cited by examiner

OPTICAL COMPONENTS FOR WAVELENGTH DIVISION MULTIPLEXING WITH HIGH-DENSITY OPTICAL INTERCONNECT MODULES

BACKGROUND

Technical Field

The present invention relates to wavelength division multiplexing and, in particular, to lens arrays used in conjunction with micro-mirrors to realize a low optical loss structure with good misalignment tolerance.

Description of the Related Art

One option for increasing the aggregate data rate in an optical system is to use wavelength division multiplexing (WDM) to transmit multiple signal channels in a single waveguide core. This increases the channel density, allowing substantially more information to be sent using the same number of fiber cores.

Recent efforts have been focused on integrating polymer waveguides with opto-electronic chip arrays (VCSEL and photodiodes) to increase the bandwidth density of an optical transmission system. Low cost fabrication techniques for high volume are being developed.

However, there are challenges in implementing WDM with conventional fabrication methods. Typically, micro-mirrors using a total-internal reflection mechanism or a gold metal coating are used to couple the light from the VCSELs into the waveguide cores and from the waveguide cores to the photodiodes. However, these micro-mirrors have no wavelength selectivity in the relevant spectral range and cannot be used as filters with light signals having multiple wavelengths. Therefore new optical layouts are needed that are easily fabricated at low cost, have a low optical loss and are compatible with a high core density in polymer waveguides and with multiplexing schemes. This is of particular importance for receivers, where several light channels having different wavelengths in the same core need to be de-multiplexed efficiently. Fabrication errors and irregularities leading to optical misalignment can substantially increase loss and bit error ratio, which is detrimental in an optical link. Moreover, to reach a high bandwidth, photodiodes arrays with small active regions and a low capacitance are needed.

SUMMARY

A wavelength division multiplexing (WDM) device includes a waveguide and a coupling lens positioned over a mirror formed in a transmission path of the waveguide. The mirror reflects incoming light signals out of the transmission path through the lens and further reflects light signals coming from the lens into the transmission path. An optical chip is positioned near a focal length of the lens. The optical chip has an optical filter configured to transmit a light signal at a first wavelength and to reflect received light signals at wavelengths other than the first wavelength.

A WDM system includes a plurality of WDM devices. A waveguide and a coupling lens positioned over a mirror formed in a transmission path of the waveguide. The mirror reflects incoming signals out of the transmission path through the lens and further reflects signals coming from the lens and into the transmission path. An optical chip is positioned near a focal length of the lens. The optical chip has an optical filter configured to transmit a light signal at a respective wavelength and to reflect received light signals at wavelengths other than the respective wavelength.

A method of forming a wavelength division multiplexing device includes forming a mirror in a transmission path of a waveguide. A lens is attached to the waveguide above the mirror. A filter is formed on an optical chip array. The filter includes a plurality of alternating dielectric layers. The filter is configured to transmit a received signal having a first wavelength and to reflect received signals having wavelengths other than the first wavelength. The optical chip array is positioned at a focal length of the lens.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Embodiments of the present invention position a double pass lens array above a double micro-mirror that is in the path of a waveguide core array. In the case of a receiver with a de-multiplexing capability, the lens array is used to give a slight inclination to the light beam reflected by one side of the micro-mirror and coming out of the waveguide plane and to focus the beam with a near normal angle on a Bragg dielectric filter that is deposited on a photodiode chip array. One of the wavelengths goes through the filter and is transmitted to the active regions of the photodiode array, while the other wavelengths are reflected back on the lens array, which is used to transfer the incoming signals back into the waveguide cores after being reflected by the second side of the micro-mirror.

The same principle applies for a transmitter with a multiplexer function using VCSEL arrays emitting light at different wavelengths, with the light going in the opposite direction and with several wavelengths added into each core. For each channel, the double pass lens array is used to collimate and focus light on the dielectric filter, transfer reflected light back into the waveguide cores by re-focusing it, and to increase overall misalignment tolerance.

Figure 1:
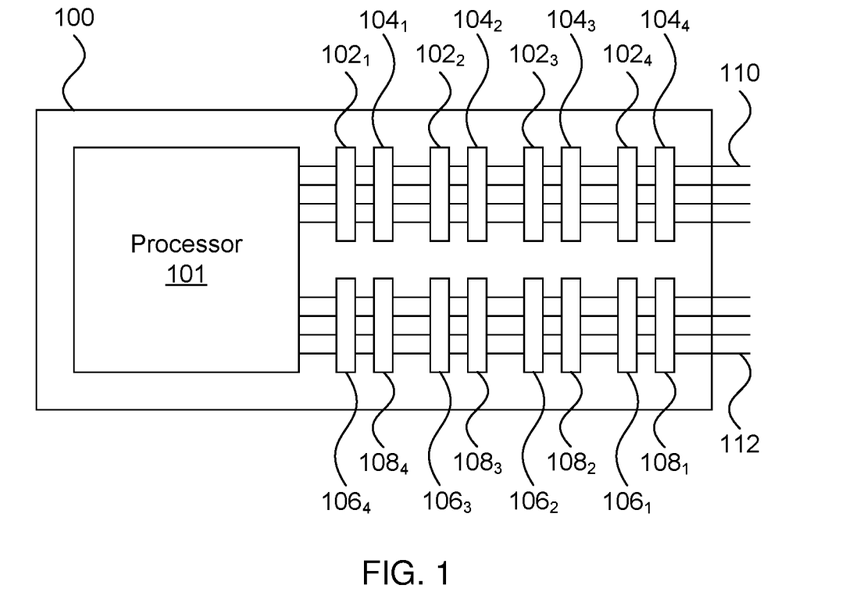
FIG. 1 is a diagram of a wavelength division multiplexing (WDM) system in accordance with the present principles.

Referring now to the drawings in which like numerals represent the same or similar elements and initially to FIG. 1, a WDM device 100 is shown. The WDM device 100 may be built on an organic carrier substrate and includes a processor 101 that sends and receives electrical signals. To communicate off the device 100, the processor 101 uses a transmission path 110 and a reception path 112 that convert electrical signals from the processor 101 to optical signals that are sent off-chip. For the transmission path 110 and the reception path 112, for example, polymer waveguides to conduct optical signals from their origin to their destination may be used. Each path may include multiple waveguide cores, with each waveguide core carrying multiple signals at different wavelengths.

In this particular example, the transmission path 110 includes a set of four laser diode driver arrays 102 paired with four respective vertical-cavity surface-emitting laser (VCSEL) arrays 104, each emitting light at a different wavelength. Each driver in the laser diode driver array 102 receives an electrical signal from the processor 101 and drives a VCSEL from the VCSEL arrays 104 to convert the electrical signal to an optical signal that is coupled into a waveguide core of the transmission path 110. On the reception path 112, photo-detector arrays 108 and trans-impedance amplifier arrays 106 convert the received optical signal to an electrical signal received by the processor 101. The transmission path 110 and the reception path 112 may each be coupled to an optical fiber array to carry the signal to another board.

Implementing this design necessitates some kind of wavelength selectivity. In particular, along the transmission path 110, light from the VCSEL arrays 1042, 1043, and 1044 need to be coupled into the waveguide cores, while light from the arrays 1041, 1042, and 1043 is transmitted. Similarly, on the receiving path 112, the photo-detector arrays 108 should detect a single wavelength from the waveguides, while light at the other wavelengths is transmitted inside the waveguide cores.

To accomplish this, the present embodiments use a Bragg filter located on the active regions of the VCSEL arrays 104 and of the photo-detector arrays 108. The Bragg filter is transparent to a single wavelength and reflective at the other wavelengths. However, as light beams that are out of the waveguide cores have a diverging angle, some optical elements are needed to focus light on the filters and on the waveguide cores to have a low optical loss. The design also needs to be tolerant to a possible misalignment of the components in the optical path. In the case of photodiodes used in the arrays 108 in particular, the active region diameters of the diodes are small to maximize bandwidth, and it is important that light be tightly focused at the right position to avoid signal loss.

Figure 2:
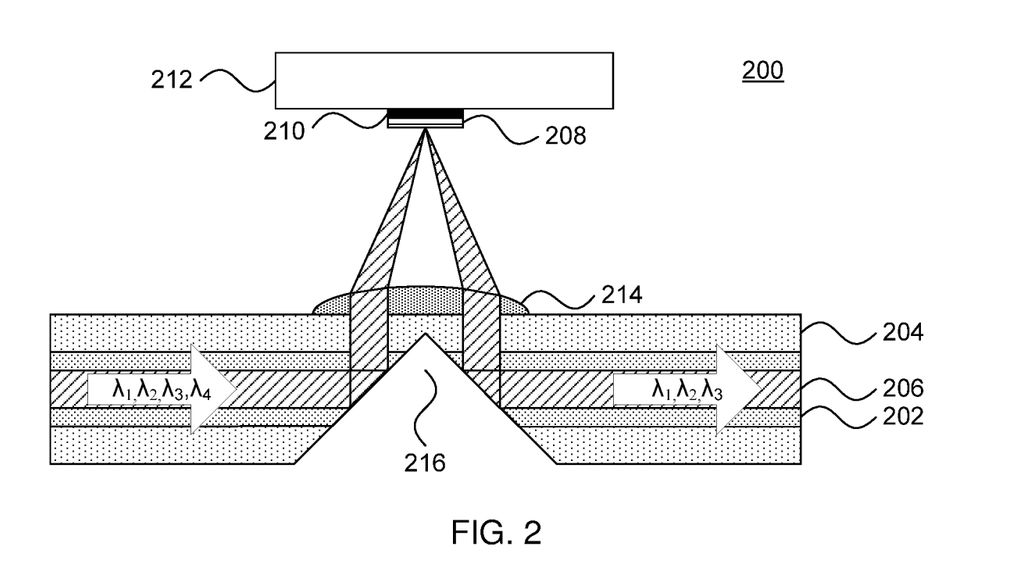
FIG. 2 is a diagram of an optical chip and filter linked to an optical waveguide via a lens and a mirror in accordance with the present principles.

Referring now to FIG. 2, part of a wavelength division multiplexing (WDM) receiver 200 is shown. The waveguide core 202 and clad 204 are made from, e.g., polymer materials having different refractive indexes. A light beam 206 propagates in the waveguide core 202 and includes several wavelengths, $\lambda_1$, $\lambda_2$, $\lambda_3$, and $\lambda_4$. The light beam 206 is incident upon one side of a micro-mirror 216, which redirects the light beam 206 out of the path of the waveguide core 202. The micro-mirror 216 may be, for example, a 45-degree air gap that operates by a total internal reflection mechanism. In this embodiment, the mirror may be formed using a dicing saw or by laser ablation. The mirror 216 may be coated with a metal or other reflective layer so that a mechanism other that total internal reflection is used.

The reflected light beam goes through the waveguide clad 204 and passes through the lens 214 positioned over the mirror 216. The lens 214 may be made of any appropriate material, including, e.g., glass or a polymer that may be similar to the waveguide clad 204. The lens 214 focuses the light beam 216 on an opto-electronic device 212. In the case of a receiver as shown, the opto-electronic device 212 is a detector, such as a photodiode. The light beam 206 is incident on a filter layer 208 that covers the active region 210 of the detector 200. The filter layer 208 may be, for example, a Bragg filter that allows passage of a single wavelength (e.g., $\lambda_1$) and reflects the other wavelengths of the light beam 206. The lens 214 is configured to direct the light beam 206 to the filter layer 208 at an angle that is near normal. The near-normal angle decreases the polarization dependence of the filter layer 208 when a Bragg filter is used and increases its efficiency. A microlens array may be fabricated using, e.g., 3D printing or other commercial technique using, for example, a mold. The microlens array may be affixed on the waveguide clad 204 with a suitable transparent adhesive. The lens 214 may be positioned on the waveguide clad 204 using specialized tweezers and a positioning mechanism that may be motorized. Alignment marks may be present on the structure surface to facilitate a precise alignment.

Reflected light signals with the wavelengths $\lambda_2$, $\lambda_3$, and $\lambda_4$ pass through the lens 214 and the waveguide clad 204 a second time and is then reflected by the second half of the micro-mirror 216 before re-entering the waveguide core 202.

The distance between the top of the lens 214 and the filter layer 208 is denoted herein as h and the angular displacement of the light beam 206 from normal is denoted as $\theta$. The light beam 206 has an initial width of w within the waveguide core 202, before it passes through the lens 214.

In one specific embodiment, the mirror 206 may have a height of, e.g., 50 µm and a width of, e.g., 100 µm, with each side having a face that lies at a 45-degree angle to the direction of propagation of the light beam 206. In this embodiment, the lens 214 has a radius of 120.7 µm and a focal length of 217 µm. It is specifically contemplated that the lens 214 may have a size that is twice as large as the light beam 206. The waveguide clad 204 and the lens 214 both have a refractive index of 1.537, while the waveguide core 202 has a refractive index of 1.555. In general, the lens 214 may be spherical or aspherical and may have a bottom diameter of about 150 µm to about 200 µm, a thickness at the center around 40-50 µm, and a focal length of about 100 µm to about 200 µm. The waveguide core 202 may have a thickness of about 30 µm to about 50 µm, while the waveguide clad may have a top and bottom thickness of about 20 µm to about 50 µm.

In one specific embodiment, the filter layer 208 is formed from a layered periodic structure having 9 periods. The filter layer 208 in this embodiment has the structure of alternating dielectric layers, where the first dielectric layer is silicon dioxide (having an exemplary index of refraction of 1.46) and the second dielectric layer is titanium dioxide (having an exemplary index of refraction of 2.4).

Figure 3:
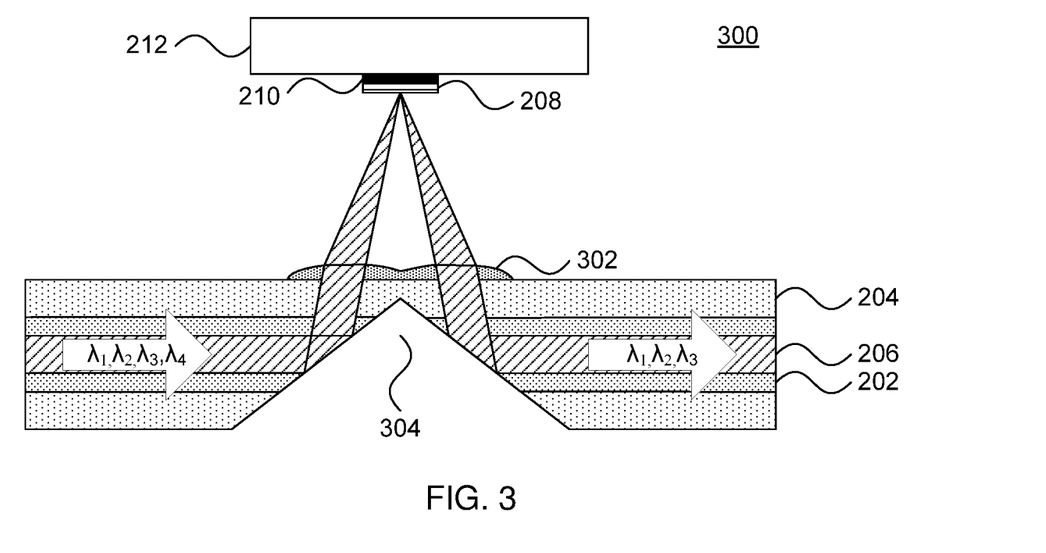
FIG. 3 is a diagram of an optical chip and filter linked to an optical waveguide via a lens and a mirror in accordance with the present principles.

Referring now to FIG. 3, an alternative embodiment of a de-multiplexor 300 is shown that could potentially decrease aberrations and optical loss. In this embodiment, rather than employing an axially symmetric lens, a lens with a planar symmetry 302 is used. As depicted, the planar symmetric lens 302 may be formed as the shape resulting from two overlapping smaller lenses, but it should be recognized that any appropriate shape may be used to decrease loss.

FIG. 3 also illustrates a mirror 304 that has a slope that is less than 45 degrees. In this case, the mirror 304 directs the light beam 206 toward the Bragg filter 208 and the lens 302 focuses the light beam 206. The reflected light beam 206 then passes through the opposite half of the planar symmetric lens 302 and reflects off the mirror 304 to return to the waveguide core 202. Depending on the waveguide index profile and the light spatial and angular power profile, this configuration may also result in a smaller spot size on the detector active region and higher misalignment tolerance.

Figure 4:
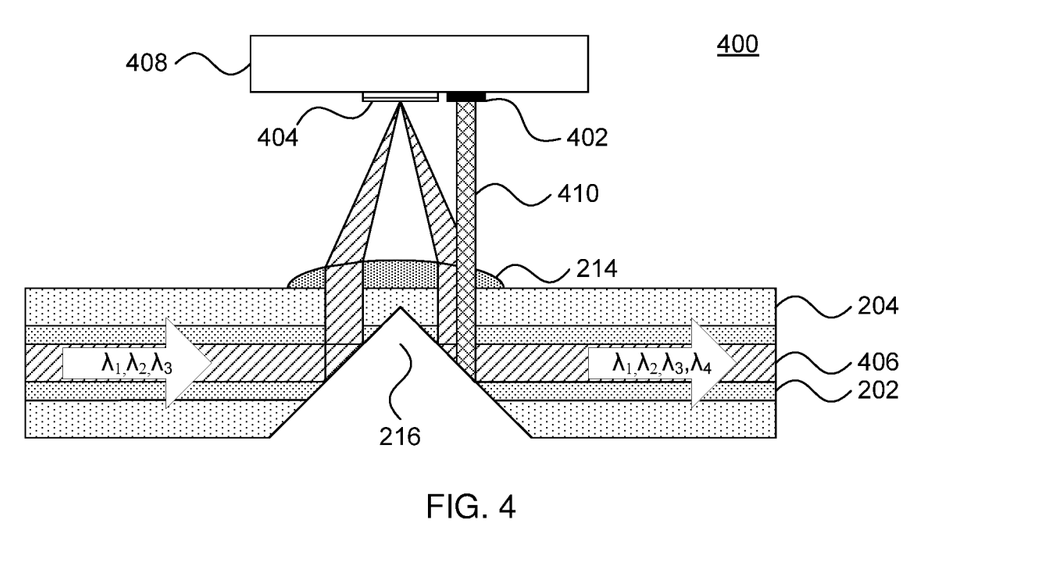
FIG. 4 is a diagram of an optical chip linked to an optical waveguide via a lens and a mirror in accordance with the present principles.

Referring now to FIG. 4, part of a WDM transmitter 400 is shown. An emitter 408 is positioned above the lens 214 and mirror 216. A light beam 406 including one or more wavelengths (in this case, $\lambda_1$, $\lambda_2$, and $\lambda_3$) is reflected by the mirror 216, passes through the lens 214, and is reflected again by the filter 404 that is transparent at the wavelength $\lambda_4$. The emitter 408 includes an active region 402 that may or may not overlap with the filter 404. It is specifically contemplated that the emitter is a high speed VCSEL with an active region 402 emitting a light beam 410 at a wavelength, $\lambda_4$. The light beam 410 is emitted at normal incidence and is positioned to be reflected only by the second side of the mirror 216. It passes through the lens 214 and is reflected into the path of the waveguide core 202. The lens 214 will have a minimal effect on the path of the new light beam 410, as it is emitted perpendicular to the waveguide plane.

Figure 5:
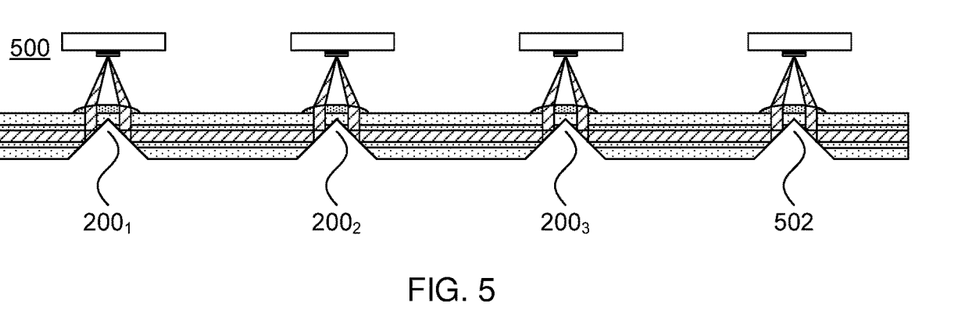
FIG. 5 is a diagram of a series of optical chips linked to an optical waveguide through respective lenses and mirrors in accordance with the present principles.

Referring now to FIG. 5, a complete demultiplexer system including a series of four detector structures 200 are shown on a single waveguide 500. In one specific embodiment, the waveguide core may propagate a light beam with a random polarization and four wavelengths: 850 nm, 940 nm, 1010 nm, and 1060 nm. Following this example, the first detector $200_1$ may have a high reflectivity for a range from 850 nm to 1010 nm and a high transmissivity at 1060 nm with light having an incidence angle around 10 degrees on the filter 208. The second receiver $200_2$ may then have a high reflectivity from 850 nm to 980 nm and a high transmissivity at 1010 nm, with light at a 1060 nm wavelength no longer in the waveguide core 202. The third filter $200_3$ would then have a high reflectivity from 850 nm to 950 nm and a high transmissivity at 980 nm, while the fourth receiver 502 may have no filter at all. The fourth receiver 502 needs no wavelength selectivity, as only one wavelength remains in the core. In one embodiment, a similar structure is used for the multiplexer system, using four emitters 400 operating at 850, 980, 1010 and 1060 nm respectively.

Figure 6:
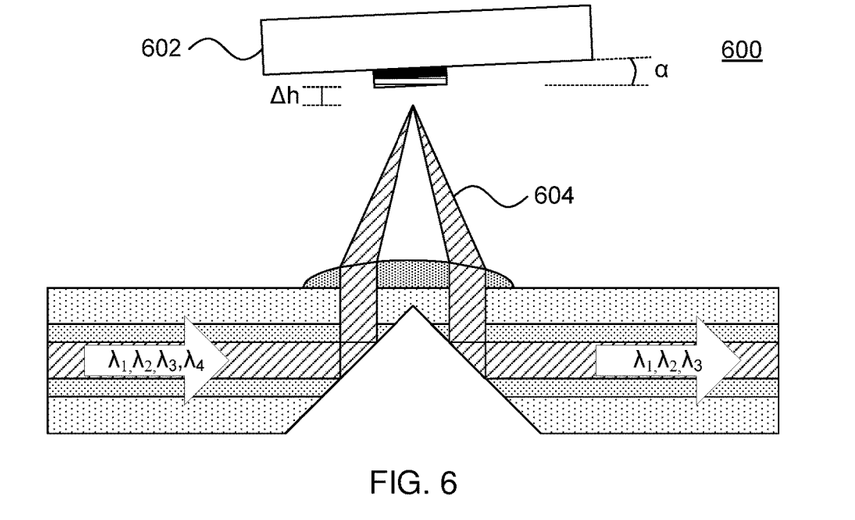
FIG. 6 is a diagram of an optical chip and filter linked to an optical waveguide through a lens and a mirror in accordance with the present principles.

Referring now to FIG. 6, it is unavoidable that during fabrication and assembly of the structure, some misalignment error will occur. In particular, the distance from the lens to the filter will have an error Δh and the photodiode-filter assembly 602 will have an angular misalignment error α. One role of the double pass lens 214 is to increase tolerance to this misalignment so that a low overall loss at all wavelengths is achieved. The total area of the detected light spot should be smaller than and completely contained within the active area of the photodiode. Moreover, the image at the waveguide output is to be reproduced at the input of the waveguide after reflection by the filters. In the specific embodiment described in FIGS. 2 and 5 above, a beam propagation calculation shows that an angular error α of +/−0.5 degree or lower and a position error Δh of +/−5 μm will result in a power loss penalty in the 1 to 4 dB range for a fundamental mode excitation input reaching the last photodiode in the receiver 502 after going through the multiple reflection optical path of the filters in the receivers $200_1$, $200_2$ and $200_3$, which is acceptable for an optical link having a typical total power budget of 10 to 12 dB.

It is to be understood that the present invention will be described in terms of a given illustrative architecture having an organic carrier substrate; however, other architectures, structures, substrate materials and process features and steps may be varied within the scope of the present invention.

It will also be understood that when an element such as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

A design for an integrated circuit chip may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer may transmit the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

Methods as described herein may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 7:
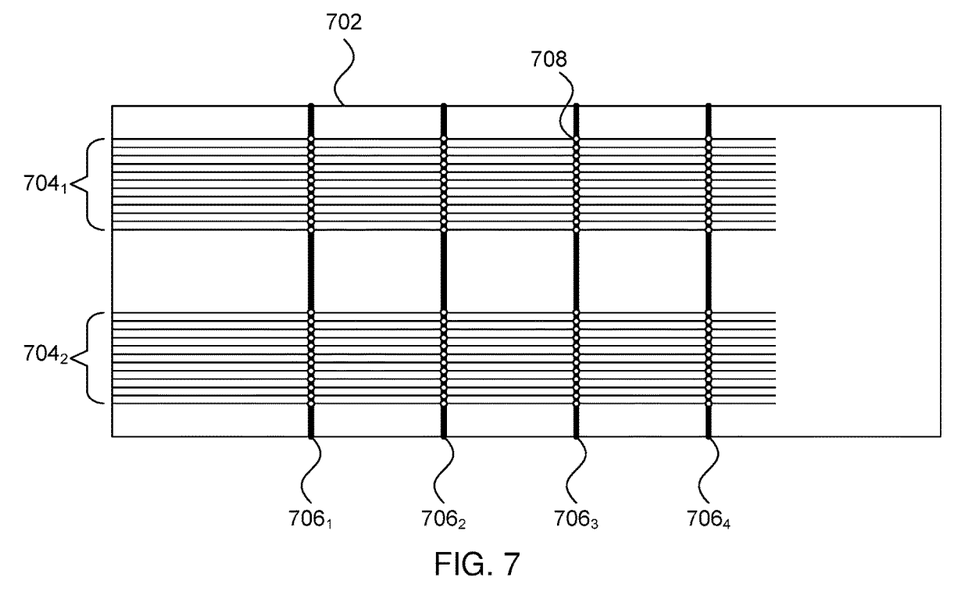
FIG. 7 is a diagram of a polymer waveguide layer structure in accordance with the present principles.

Referring now to FIG. 7, a polymer waveguide structure 702 is shown having an exemplary area of several square centimeters with two multi-channel core arrays 7041 and 7042 for transmitter and receiver parts respectively. Grooves 706 are made from the back of the structure to form the double-sided micro-mirrors 200. A lens 708 is placed above each groove 706 where it intersects with waveguides 704. The polymer waveguide structure 702 has exemplary dimensions of, e.g., about 10 mm by about 25 mm.

Figure 8:
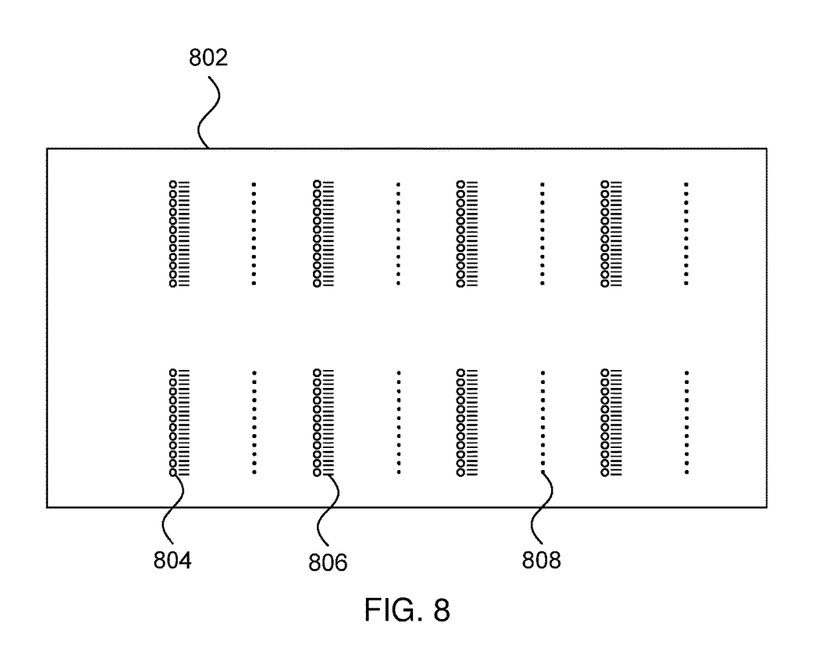
FIG. 8 is a diagram of a chip carrier layer in accordance with the present principles.

Referring now to FIG. 8, a chip carrier 802 is shown. The chip carrier 802 has exemplary dimensions of about 10 mm by about 20 mm and may be formed from, e.g., silicon or other appropriate circuit board material with an exemplary thickness of about the focal length of the lenses 708. Holes 804 are formed having a diameter slightly larger than the lenses 708 and vias 808 are formed for electrical contacts. Surface contacts 806 are formed on the chip carrier 802 by, e.g., evaporating gold or other conductor to form conductive pads.

Figure 9:
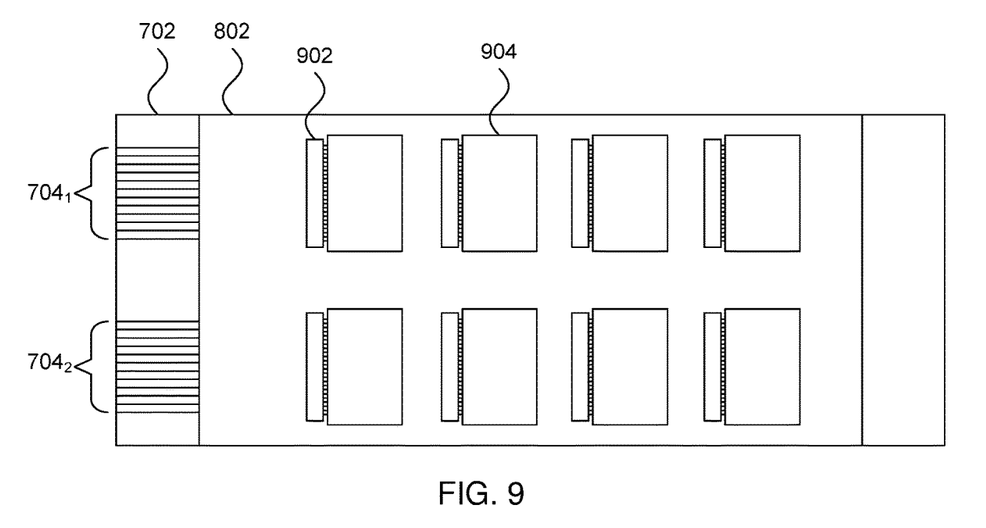
FIG. 9 is a diagram of an assembled WDM system in accordance with the present principles.

Referring now to FIG. 9, the chip carrier 802 is affixed on top of the polymer waveguide structure 702. Flip-chip bonding is used to electrically link chips 902 and 904 onto the chip carrier 802 in contact with the appropriate electrical contacts. The entire structure can then be affixed to a substrate and vias 808 may be used to connect the chips 902/904 to other electrical structures.

Figure 10:
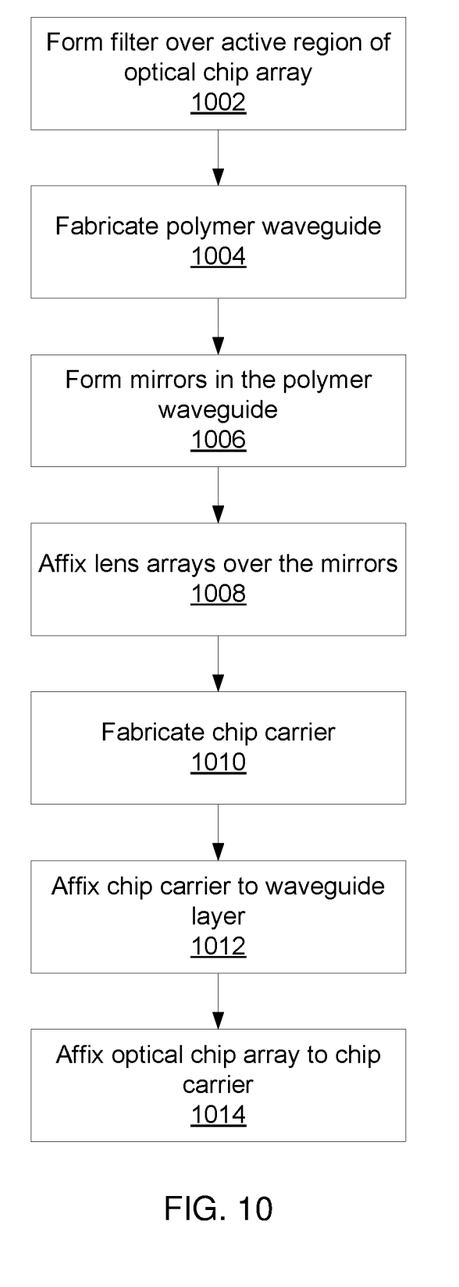
FIG. 10 is a block/flow diagram of a method of fabricating a WDM system in accordance with the present principles.

Referring now to FIG. 10, a method for forming a complete WDM system 100 is shown. Block 1002 forms a filter 208 over the active region of an optical chip array 212. Forming the filter 208 may be performed by, e.g., evaporating alternating layers of titanium dioxide and silicon dioxide to create a filter having a high transmissivity at one specific wavelength and a high reflectivity at other wavelengths in use. Block 1004 fabricates the polymer waveguide 702 using any appropriate technique, including forming the waveguide cores 206 in the polymer waveguide 702. Block 1006 forms mirrors 706 in the polymer waveguide structure 702 perpendicular to the length of the waveguides 704. This may be performed using, e.g., a 45-degree dicing blade, to create a mirror that operates by total internal reflection. Block 1008 affixes lens arrays 708 over the mirrors 706.

Block 1010 fabricates chip carrier 802 as described above, with holes 804 aligned and sized to accommodate the lens arrays 708 and electrical contacts 806 and vias 808. Block 1012 affixes the chip carrier 802 to the waveguide layer 702. Block 1014 then affixes optical chips 902/904 to the chip carrier 802, with the appropriate contacts 806 and vias 808 providing electrical connectivity.

Having described preferred embodiments of optical components for wavelength division multiplexing with high-density optical interconnect modules (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A wavelength division multiplexing (WDM) device, comprising:
   a waveguide;
   a coupling lens positioned over a mirror formed in a transmission path of the waveguide, wherein the mirror reflects incoming signals out of the transmission path through the lens and further reflects signals coming from the lens into the transmission path; and
   an optical chip comprising a plurality of optical devices, including both emitting devices and receiving devices, along the transmission path, wherein each emitting device is configured to operate at a different wavelength and each receiving device is configured to operate at a different wavelength, and wherein each optical device is respectively selected from the group consisting of a photodiode and a laser, positioned such that the optical device is at a focal length of the lens, and comprising
   an optical filter, covering an active region of the optical device, that is configured to transmit a light signal at a first wavelength and to reflect received light signals at wavelengths other than the first wavelength.

2. The WDM device of claim 1, wherein the optical filter is a Bragg filter comprising alternating dielectric layers.

3. The WDM device of claim 2, wherein the Bragg filter comprises alternating layers of silicon dioxide and titanium dioxide.

4. The WDM device of claim 2, wherein the Bragg filter has nine periods of the alternating layers.

5. The WDM device of claim 1, wherein the mirror is a groove in the waveguide that reflects incoming and outgoing signals by total internal reflection.

6. The WDM device of claim 1, wherein the lens changes a direction of the incoming signals to aim toward the optical filter.

7. The WDM device of claim 1, wherein the lens is axially asymmetric about its principal axis to minimize dispersion and maximize misalignment tolerance.

8. The WDM device of claim 1, wherein the mirror has an angle other than 45 degrees.

9. A wavelength division multiplexing (WDM) system, comprising:
   a plurality of WDM devices, each device having wavelength selectivity and comprising:
   a waveguide;
   a coupling lens positioned over a mirror formed in a transmission path of the waveguide, wherein the mirror reflects incoming signals out of the transmission path through the lens and further reflects light signals coming from the lens into the transmission path; and
   an optical chip comprising a plurality of optical devices, including both emitting devices and receiving devices, along the transmission path, wherein each emitting device is configured to operate at a different wavelength and each receiving device is configured to operate at a different wavelength, and wherein each optical device is respectively selected from the group consisting of a photodiode and a laser, positioned such that the optical device is at a focal length of the lens and comprising an optical filter, over an active region of the optical device, that is configured to transmit a light signal at a respective wavelength and to reflect received light signals at wavelengths other than the respective wavelength.

10. The WDM system of claim 9, wherein each optical filter is a Bragg filter comprising alternating dielectric layers.

11. The WDM device of claim 2, wherein the Bragg filter is in contact with the optical device.

12. The WDM system of claim 9, wherein each mirror is a groove in the waveguide that reflects incoming and outgoing signals by total internal reflection.

13. The WDM system of claim 9, wherein each lens changes a direction of the incoming signals to aim toward the optical filter.

14. The WDM system of claim 9, wherein the lens is an axially asymmetric lens to minimize dispersion and maximize misalignment tolerance.

15. The WDM system of claim 9, wherein the mirror has an angle other than 45 degrees.

16. A method of forming a wavelength division multiplexing device, comprising:
    forming a mirror in a transmission path of a waveguide;
    attaching a lens to the waveguide above the mirror;
    forming a filter on an optical chip array comprising a plurality of optical devices, including both emitting devices and receiving devices, along the transmission path, wherein each emitting device is configured to operate at a different wavelength and each receiving device is configured to operate at a different wavelength, and wherein each optical device is respectively selected from the group consisting of a photodiode and a laser, the filter comprising a plurality of alternating dielectric layers, wherein the filter is positioned over an active region of the optical device and configured to transmit a received signal having a first wavelength and to reflect received signals having wavelengths other than the first wavelength; and
    positioning the optical chip array such that the optical device is at a focal length of the lens.

17. The method of claim 16, wherein forming the mirror comprises making a groove into the waveguide having a surface angle configured to provide total internal reflection of signals.

18. The method of claim 16, wherein forming the filter comprises evaporating alternating layers of silicon dioxide and titanium dioxide onto an active region of the optical chip array.

19. The method of claim 16, further comprising positioning a chip carrier on the waveguide, the chip carrier having a hole corresponding to the lens, wherein positioning the optical chip array comprises flip-chip bonding the optical chip array to the chip carrier over the lens.

20. The WDM device of claim 1, wherein the lens is aspherical.

21. The WDM device of claim 1, wherein the optical chip includes both the photodiode and the laser.

* * * * *